(12) United States Patent
Tadiello et al.

(10) Patent No.: US 12,545,053 B2
(45) Date of Patent: Feb. 10, 2026

(54) TIRES FOR VEHICLE WHEELS

(71) Applicant: Pirelli Tyre S.p.A., Milan (IT)

(72) Inventors: Luciano Tadiello, Milan (IT); Luca Giannini, Milan (IT); Silvia Guerra, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 0 days.

(21) Appl. No.: 18/709,321

(22) PCT Filed: Nov. 17, 2022

(86) PCT No.: PCT/IB2022/061063
§ 371 (c)(1),
(2) Date: May 10, 2024

(87) PCT Pub. No.: WO2023/089508
PCT Pub. Date: May 25, 2023

(65) Prior Publication Data
US 2025/0033411 A1 Jan. 30, 2025

(30) Foreign Application Priority Data
Nov. 18, 2021 (IT) .......................... 102021000029213

(51) Int. Cl.
*B60C 1/00* (2006.01)
*C08K 3/04* (2006.01)
*C08L 19/00* (2006.01)

(52) U.S. Cl.
CPC .......... *B60C 1/0041* (2013.01); *B60C 1/0025* (2013.01); *C08K 3/041* (2017.05);
(Continued)

(58) Field of Classification Search
CPC ................ B60C 1/0041; B60C 1/0025; B60C 2001/005; B60C 2001/0066; C08K 3/041; C08L 19/00
See application file for complete search history.

(56) References Cited

U.S. PATENT DOCUMENTS 2,610,954 A 9/1952 Raff et al.
2,802,815 A 8/1957 Doughty
(Continued)

FOREIGN PATENT DOCUMENTS

CN 102718995 A 10/2012
CN 103756060 A 4/2014
(Continued)

OTHER PUBLICATIONS

International Search Report form the European Patent Office in corresponding International Application No. PCT/IB2022/061063 mailed Mar. 22, 2023.
(Continued)

*Primary Examiner* — Angela C Scott
(74) *Attorney, Agent, or Firm* — Finnegan, Henderson, Farabow, Garrett & Dunner, L.L.P.

(57) ABSTRACT

The present invention relates to a tire for vehicle wheels comprising at least one structural component comprising at least one reinforcing element comprising an elongate member coated with, or embedded in, a vulcanised elastomeric compound obtained by vulcanising an elastomeric composition comprising per 100 phr of diene elastomeric polymer: (i) a predispersion of a diene elastomeric polymer and lignin, in an amount to provide the elastomeric composition with 100 to 10 phr of diene elastomeric polymer and an amount of lignin equal to or greater than 25 phr. (ii) 0 to 90 phr of a diene elastomeric polymer, (iii) at least 30 phr of a carbon black reinforcing filler, (iv) optionally, a reinforcing resin comprising at least 1 phr of a methylene acceptor compound associated with at least 1 phr of a methylene donor compound, and (v) 0.1 to 12 phr of at least one vulcanising agent, wherein at least 50 phr of said diene elastomeric polymer consists of natural or synthetic isoprene rubber.

17 Claims, 1 Drawing Sheet

(52) U.S. Cl.
CPC ........ *C08L 19/00* (2013.01); *B60C 2001/005* (2013.01); *B60C 2001/0066* (2013.01)

(56) References Cited

U.S. PATENT DOCUMENTS

| | | |
|---|---|---|
| 2,845,397 A | 7/1958 | Mills |
| 2,845,937 A | 8/1958 | Ksieski |
| 2,906,718 A | 9/1959 | Mills et al. |
| 3,079,360 A | 2/1963 | Sutherland, Jr. et al. |
| 3,163,614 A | 12/1964 | Dimitri |
| 3,282,871 A | 11/1966 | Dimitri |
| 3,296,158 A | 1/1967 | Mitchell |
| 3,312,643 A | 4/1967 | Ball |
| 3,364,158 A | 1/1968 | Griffith et al. |
| 3,817,974 A | 6/1974 | Sirianni et al. |
| 3,984,362 A | 10/1976 | Sirianni et al. |
| 3,991,022 A | 11/1976 | Dimitri |
| 2010/0204368 A1 | 8/2010 | Benko et al. |
| 2020/0269634 A1 | 8/2020 | Castellani et al. |
| 2025/0033412 A1* | 1/2025 | Giannini ............... B60C 1/0041 |

FOREIGN PATENT DOCUMENTS

| | | |
|---|---|---|
| GB | 723751 A | 2/1955 |
| GB | 836393 A | 6/1960 |
| IT | 102020000032627 A | 12/2021 |
| JP | 2008308615 A | 12/2008 |
| JP | 2010242023 A | 10/2010 |
| JP | 2010248282 A | 11/2010 |
| JP | 2014129509 A | 7/2014 |
| WO | 2009145784 A1 | 12/2009 |
| WO | 2014097108 A1 | 6/2014 |
| WO | 2017109672 A1 | 6/2017 |
| WO | 2023089508 A1 | 5/2023 |

OTHER PUBLICATIONS

Written Opinion of the International Searching Authority from the European Patent Office in corresponding International Application No. PCT/IB2022/061063 mailed Mar. 22, 2023.

* cited by examiner

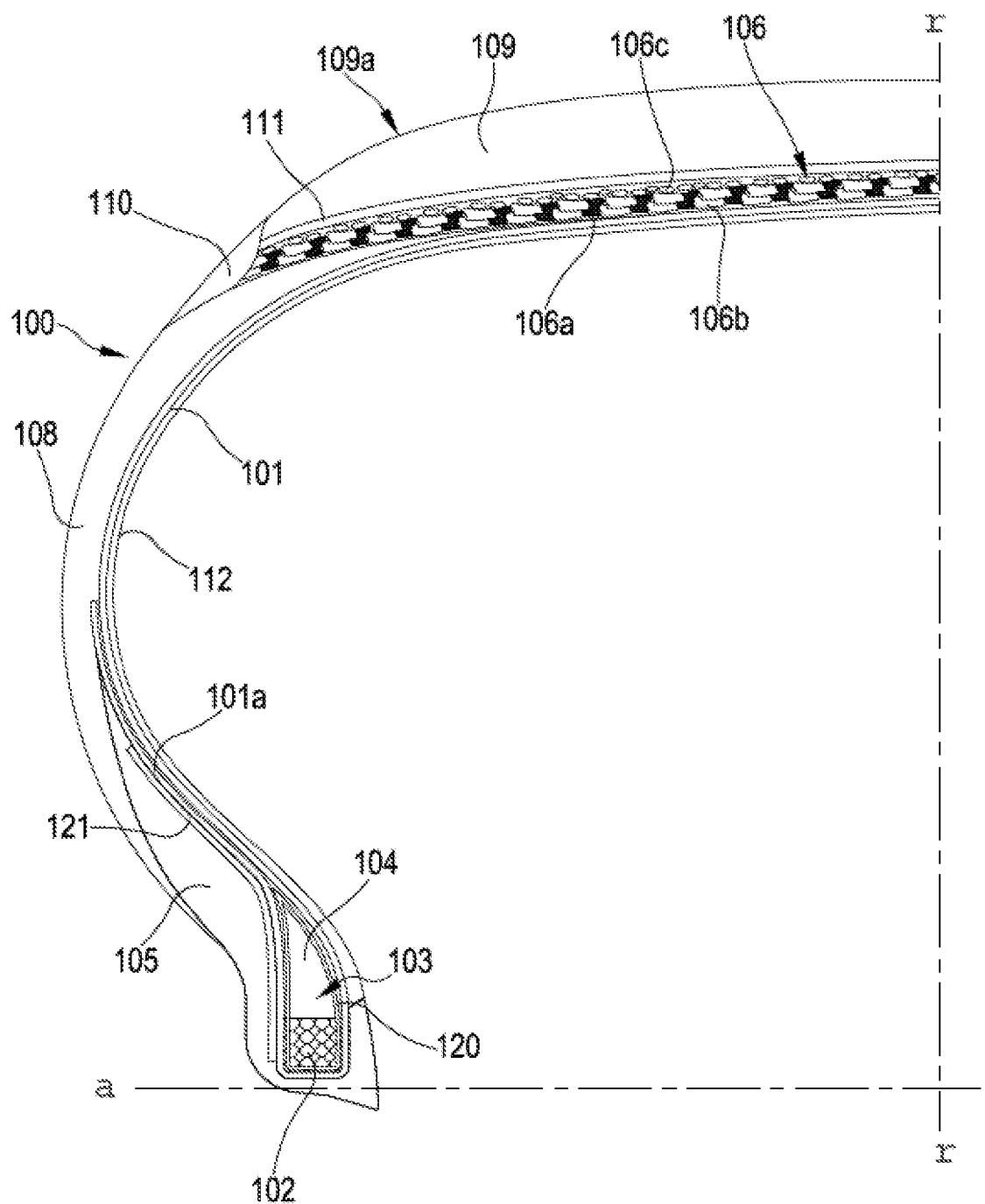

TIRES FOR VEHICLE WHEELS

This application is a national stage entry application under 35 U.S.C. § 371 of International Application No. PCT/IB2022/061063, filed on Nov. 17, 2022, and claims priority to Italian Application No. 102021000029213, filed Nov. 18, 2021; the contents of each application is incorporated herein by reference in its entirety.

FIELD OF THE INVENTION

The present invention relates to a tire for vehicle wheels. More in particular, the present invention relates to a tire for vehicle wheels comprising at least one structural component comprising a reinforcing element comprising an elongate member coated with, or embedded in, a vulcanised elastomeric compound obtained by vulcanising an elastomeric composition comprising a predispersion of a diene elastomeric polymer and lignin.

PRIOR ART

A tire for vehicle wheels typically comprises a carcass structure comprising at least one carcass layer having opposite lateral edges associated with respective bead structures, a belt structure applied in a radially external position to the carcass structure, and a tread band disposed in a position radially external to the belt structure.

The carcass structure is designed, in addition to supporting the weight of the vehicle, to resist the inflation pressure and all the lateral and longitudinal stresses to which the running tire is subjected following contact with the road surface.

The belt structure is designed to transfer the aforementioned lateral and longitudinal stresses to the carcass structure and helps to confer the desired features of structural strength, grip, driving stability, controllability, directionality, road grip, comfort and to maintain these performances over time.

The bead structures are designed to withstand the circumferential, transverse and combined stresses that are transmitted between the wheel rim and the tire during normal conditions of use, for example in acceleration, braking and when turning, possibly even at high speed.

Typically in the carcass and belt structure of the tire, and in some components of the bead structures (for example chafer and flipper), there are reinforcing elements consisting of an elongate member of various nature-metal or polymeric-embedded in a matrix of vulcanised elastomeric compound, in order to stiffen the structure of the tire while seeking the best balance of properties.

The elongate members in polymeric material are generally made with polyester, rayon, lyocell and polyamide threads, while the elongate members in metal are generally made with steel wires, preferably coated with a metal alloy, such as copper/zinc, zinc/manganese, zinc/molybdenum/cobalt alloys, and the like.

The matrix of vulcanised elastomeric compound is made through the vulcanisation of an elastomeric composition comprising at least one diene elastomeric polymer, at least one reinforcing filler and at least one reinforcing resin comprising a methylene acceptor associated with at least one methylene donor compound, in order to improve the features of the cross-linked products obtained, in particular the mechanical properties.

Due to its high reinforcing efficiency, carbon black is a particularly used reinforcing filler. However, carbon black represents a non-renewable raw material, deriving mainly from partial combustion processes of fossil fuels, mainly naphtha, methane gas, and other hydrocarbons. In addition, carbon black can be of environmental concern as it is a potential pollutant if not properly disposed of. The replacement or reduction of the use of carbon black therefore represents an objective not only of interest for tire manufacturers, but of common interest for the community.

The Applicant has perceived the need to supply more eco-sustainable and eco-compatible tires and components thereof, for example, through the reduction or replacement of raw materials from petroleum with raw materials produced from renewable sources with the aim of maintaining and possibly improve, the performance of the tire.

Among the most abundant biopolymers from renewable sources for application in tires, starch, cellulose, lignin, and hemicellulose may be mentioned as examples. In the past, various attempts have been made to use some of these materials as reinforcing agents, which also have a lower specific weight than traditional reinforcing fillers. Lignin, for example, has been used, as it is or modified in various ways, as a reinforcing filler in tire compounds.

Lignin is an organic polymer complex having a three-dimensional polymeric structure consisting of phenylpropane units, and belonging to the class of so-called phenylpropanoid compounds.

Lignins have very different compositions and molecular weights, both as a function of the biomass chosen and the process with which they are obtained. The composition varies both in terms of functional groups, mainly of the phenolic type, hydroxyl and carboxylic types, and in terms of molecular weight.

Vehicle wheel tires comprising lignin are described in patent applications US2010/0204368, WO2009/145784, JP2008/308615, JP2010/242023, JP2010/248282, JP2014/129509, CN102718995, CN103756060, WO2014/097108, WO2017/109672, IT102020000032627, and in patents GB723751, GB836393, U.S. Pat. Nos. 2,610,954, 2,802,815, 2,906,718, 3,079,360, 3,163,614, 3,282,871, 3,296,158, 3,312,643, 3,364,158, 3,817,974, 3,984,362 and 3,991,022.

SUMMARY OF THE INVENTION

The Applicant has carried out an intense research activity in order to find the way to use lignin for the production of tire compounds which has led to the filing of the international patent applications published with the number WO2014/097108 and WO2017/109672.

WO2014/097108 relates to a tire for vehicle wheels comprising at least one structural component comprising a cross-linked elastomeric material obtained by vulcanising an elastomeric composition comprising (a) at least one diene elastomeric polymer; (b) at least one carbon black reinforcing filler; and (c) at least one functionalised lignin selected from the group consisting of esterified lignin and etherified and esterified lignin.

WO2017/109672 relates to a tire for vehicle wheels comprising at least one structural component comprising a cross-linked elastomeric material obtained by vulcanising an elastomeric composition comprising a predispersion of natural rubber and lignin obtained by co-precipitation from latex, where said predispersion comprises an amount of lignin such as to provide in the elastomeric composition a lignin concentration equal to or less than about 25 phr.

Furthermore, the Applicant has recently found and described in patent application IT 102020000032627 that it is possible to obtain a predispersion of a diene elastomeric polymer and lignin comprising high amounts of lignin, in particular equal to or greater than 45 phr, with the advantage of having a greater flexibility of formulation of vulcanisable elastomeric compositions.

Continuing the experimentation in this field, the Applicant has surprisingly found that the use of the predispersions described in the patent applications WO2017/109672 and IT102020000032627 in partial replacement of the carbon black in the elastomeric compositions typically used for the rubberising of reinforcing elements for tires to a substantial reduction of the hysteresis of the compositions themselves, with consequent reduction of energy dissipation during use of the tire, and of fuel consumption.

The reduction of hysteresis values, in particular in the case of reinforcing elements used in the internal structural components of a tire, such as for example the carcass structure, the belt structure and the bead components, also prevents the onset of excessively high operating temperatures within the structural components, which may risk compromising the integrity of the tire.

This surprising result, never encountered in other applications of lignin, such as those described in WO2014/097108 and WO2017/109672, was obtained without penalising the mechanical properties of the vulcanised compound.

On the contrary, the Applicant has also found a surprising increase in the adhesion of the rubber compound to the elongate textile and/or metal member used for making the reinforcing element. This surprising increase leads the Applicant to believe, on the basis of their experience, that it is possible to omit from the rubberising compound the reinforcing resins comprising methylene acceptors and donors conventionally used in the rubberising compound.

Therefore, in a first aspect thereof, the present invention relates to a tire for vehicle wheels comprising at least one structural component comprising at least one reinforcing element comprising an elongate member coated with, or embedded in, a vulcanised elastomeric compound obtained by vulcanising an elastomeric composition comprising per 100 phr of diene elastomeric polymer:

(i) a predispersion of a diene elastomeric polymer and lignin, in an amount to provide the elastomeric composition with 100 to 10 phr of diene elastomeric polymer and an amount of lignin equal to or greater than 25 phr,
(ii) 0 to 90 phr of a diene elastomeric polymer,
(iii) at least 30 phr of a carbon black reinforcing filler,
(iv) optionally, a reinforcing resin comprising at least 1 phr of a methylene acceptor compound associated with at least 1 phr of a methylene donor compound, and
(v) 0.1 to 12 phr of at least one vulcanising agent,
wherein at least 50 phr of said diene elastomeric polymer consists of natural or synthetic isoprene rubber.

In a second aspect thereof, the present invention relates to a tire structural component comprising at least one reinforcing element comprising an elongate member coated with, or embedded in, a vulcanised elastomeric compound obtained by vulcanising an elastomeric composition comprising per 100 phr of diene elastomeric polymer:

(i) a predispersion of a diene elastomeric polymer and lignin, in an amount to provide the elastomeric composition with 100 to 10 phr of diene elastomeric polymer and an amount of lignin equal to or greater than 25 phr,
(ii) 0 to 90 phr of a diene elastomeric polymer,
(iii) at least 30 phr of a carbon black reinforcing filler,
(iv) optionally, a reinforcing resin comprising at least 1 phr of a methylene acceptor compound associated with at least 1 phr of a methylene donor compound, and
(v) 0.1 to 12 phr of at least one vulcanising agent,
wherein at least 50 phr of said diene elastomeric polymer consists of natural or synthetic isoprene rubber.

In a third aspect thereof, the present invention relates to a reinforcing element comprising an elongate member coated with, or embedded in, a vulcanised elastomeric compound obtained by vulcanising an elastomeric composition comprising per 100 phr of diene elastomeric polymer:

(i) a predispersion of a diene elastomeric polymer and lignin, in an amount to provide the elastomeric composition with 100 to 10 phr of diene elastomeric polymer and an amount of lignin equal to or greater than 25 phr,
(ii) 0 to 90 phr of a diene elastomeric polymer,
(iii) at least 30 phr of a carbon black reinforcing filler,
(iv) optionally, a reinforcing resin comprising at least 1 phr of a methylene acceptor compound associated with at least 1 phr of a methylene donor compound, and
(v) 0.1 to 12 phr of at least one vulcanising agent,
wherein at least 50 phr of said diene elastomeric polymer consists of natural or synthetic isoprene rubber.

In a fourth aspect thereof, the present invention relates to an elastomeric composition comprising per 100 phr of diene elastomeric polymer:

(i) a predispersion of a diene elastomeric polymer and lignin, in an amount to provide the elastomeric composition with 100 to 10 phr of diene elastomeric polymer and an amount of lignin equal to or greater than 25 phr,
(ii) 0 to 90 phr of a diene elastomeric polymer,
(iii) at least 30 phr of a carbon black reinforcing filler,
(iv) optionally, a reinforcing resin comprising at least 1 phr of a methylene acceptor compound associated with at least 1 phr of a methylene donor compound, and
(v) 0.1 to 12 phr of at least one vulcanising agent,
wherein at least 50 phr of said diene elastomeric polymer consists of natural or synthetic isoprene rubber.

Definitions

The term "elastomeric composition" means a composition comprising at least one diene elastomeric polymer and one or more additives, which by mixing and possible heating provides an elastomeric compound suitable for use in tires and components thereof.

The components of the elastomeric composition are not generally introduced simultaneously into the mixer but typically added in sequence. In particular, the vulcanisation additives, such as the vulcanisation agent and possibly the accelerant and retardant agents, are usually added in a downstream step with respect to the incorporation and processing of all the other components.

In the final vulcanisable elastomeric compound, the individual components of the elastomeric composition may be altered or no longer individually traceable as modified, completely or in part, due to the interaction with the other components, of heat and/or mechanical processing. The term "elastomeric composition" herein is meant to include the set of all the components that are used in the preparation of the elastomeric compound, regardless of whether they are actually present simultaneously, are introduced sequentially or are then traceable in the elastomeric compound or in the final tire.

The term "elastomeric polymer" indicates a natural or synthetic polymer which, after vulcanisation, may be stretched repeatedly at room temperature to at least twice its original length and after removal of the tensile load substantially immediately returns with force to approximately its original length (according to the definitions of the ASTM D1566-11 Standard terminology relating to Rubber).

The term "diene elastomeric polymer" indicates a polymer or copolymer derived from the polymerisation of one or more different monomers, among which at least one of them is a conjugated diene (conjugated diolefin).

The term "elastomeric compound" indicates the compound obtainable by mixing and possibly heating at least one elastomeric polymer with at least one of the additives commonly used in the preparation of tire compounds.

The term "vulcanisable elastomeric compound" indicates the elastomeric compound ready for vulcanisation, obtainable by incorporation into an elastomeric compound of all the additives, including those of vulcanisation.

The term "vulcanised elastomeric compound" means the material obtainable by vulcanisation of a vulcanisable elastomeric compound.

The term "green" indicates a material, a compound, a composition, a component or a tire not yet vulcanised.

The term "vulcanisation" refers to the cross-linking reaction in a natural or synthetic rubber induced by a typically sulphur-based cross-linking agent.

The term "vulcanisation agent" indicates a product capable of transforming natural or synthetic rubber into elastic and resistant material by virtue of the formation of a three-dimensional network of inter- and intra-molecular bonds. Typical vulcanisation agents are sulphur-based compounds such as elemental sulphur, polymeric sulphur, sulphur-donor agents such as bis [(trialkoxysilyl) propyl]polysulphides, thiurams, dithiodimorpholines and caprolactamdisulphide.

The term "vulcanisation accelerant" means a compound capable of decreasing the duration of the vulcanisation process and/or the operating temperature, such as sulphenamides, thiazoles, dithiophosphates, dithiocarbamates, guanidines, as well as sulphur donors such as thiurams.

The term "vulcanisation activating agent" indicates a product capable of further facilitating the vulcanisation, making it happen in shorter times and possibly at lower temperatures. An example of activating agent is the stearic acid-zinc oxide system.

The term "vulcanisation retardant" indicates a product capable of delaying the onset of the vulcanisation reaction and/or suppressing undesired secondary reactions, for example N-(cyclohexylthio) phthalimide (CTP).

The term "vulcanisation package" is meant to indicate the vulcanisation agent and one or more vulcanisation additives selected from among vulcanisation activating agents, accelerants and retardants.

The term "reinforcing filler" is meant to refer to a reinforcing material typically used in the sector to improve the mechanical properties of tire rubbers, preferably selected from among carbon black, conventional silica, such as silica from sand precipitated with strong acids, preferably amorphous, diatomaceous earth, calcium carbonate, titanium dioxide, talc, alumina, aluminosilicates, kaolin, silicate fibres and mixtures thereof.

The term "mixing step (1)" indicates the step of the preparation process of the elastomeric compound in which one or more additives may be incorporated by mixing and possibly heating, except for the vulcanisation agent which is fed in step (2). The mixing step (1) is also referred to as "non-productive step". In the preparation of a compound there may be several "non-productive" mixing steps which may be indicated with 1a, 1b, etc. The term "mixing step (2)" indicates the next step of the preparation process of the elastomeric compound in which the vulcanisation agent and, possibly, the other additives of the vulcanisation package are introduced into the elastomeric compound obtained from step (1), and mixed in the material, at controlled temperature, generally at a compound temperature lower than 120° C., so as to provide the vulcanisable elastomeric compound. The mixing step (2) is also referred to as "productive step".

The term "structural component" of a tire means any layer of elastomeric material of the tire including reinforcing elements. A structural component of a tire may be a layer included in a reinforcing structure (for example carcass structure or belt structure) or it may be a reinforcement layer (for example zero degree belt layer, bead reinforcement layer or "flipper", sidewall reinforcement layer or "chafer").

The term "reinforcing element" of a tire indicates any elongate member of textile or metal material embedded in a vulcanised elastomeric compound.

The term "elongate member" represents the element consisting of one or more long-shaped elements, possibly twisted together, in textile or metal material. The elongate member is also referred to as cord.

The term "radial carcass structure" indicates a carcass structure comprising a plurality of reinforcing elements, each substantially lying along a respective plane passing through the radius of the tire. Such reinforcing elements may be incorporated in a single carcass ply or in several carcass plies (preferably two) radially superimposed on each other.

The terms "radial" and "axial" and the expressions "radially internal/external" and "axially internal/external" are used referring respectively to a direction substantially parallel to the equatorial plane of the tire and to a direction substantially perpendicular to the equatorial plane of the tire, i.e. respectively to a direction substantially perpendicular to the axis of rotation of the tire and to a direction substantially parallel to the axis of rotation of the tire.

The term "crossed belt structure" means a belt structure comprising a first belt layer including reinforcing elements substantially parallel to each other and inclined with respect to the equatorial plane of the tire by a predetermined angle and at least a second belt layer disposed in a radially external position with respect to the first belt layer and including reinforcing elements substantially parallel to each other but lying, with respect to the equatorial plane of the tire, with an inclination opposite to that of the reinforcing elements of the first layer.

The term "zero-degree belt structure" indicates a reinforcing layer comprising at least one reinforcing element wound on the belt structure according to a substantially circumferential winding direction, i.e. according to a winding direction having an inclination of less than 6° with respect to the equatorial plane of the tire.

The terms "circumferential" and "circumferentially" are used with reference to the direction of the annular extension of the tire, i.e. to the rolling direction of the tire, which corresponds to a direction lying on a plane coinciding with or substantially parallel to the equatorial plane of the tire.

By "substantially axial direction" it is meant a direction inclined, with respect to the equatorial plane of the tire, by an angle of between about 70° and about 90°.

By "substantially circumferential direction" it is meant a direction stretched, with respect to the equatorial plane of the tire, at an angle of between about 0° and about 10°.

For the purposes of the present description and the following claims, the term "phr" (acronym for parts per hundreds of rubber) indicates the parts by weight of a given elastomeric compound component per 100 parts by weight of the elastomeric polymer, considered net of any extension oils.

Unless otherwise indicated, all the percentages are expressed as percentages by weight.

The Predispersion of Diene Elastomeric Polymer and Lignin

Preferably, the diene elastomeric polymer of the predispersion according to the present invention is any diene elastomeric polymer as described below in the present description.

More preferably, the diene elastomeric polymer is selected from natural (NR) or synthetic (IR) isoprene rubber, emulsion polymerisation styrene-butadiene rubber (ESBR), carboxylated emulsion polymerisation styrene-butadiene rubber (XSBR), nitrile rubber (NBR), carboxylated nitrile rubber (XNBR), chloroprene rubber (CR), butyl rubber (IIR).

Advantageously, the diene elastomeric polymer is selected from natural (NR) or synthetic (IR) isoprene rubber.

Preferably, the predispersion of diene elastomeric polymer and lignin comprises an amount of lignin equal to or greater than about 45 phr, preferably equal to or greater than about 50 phr, even more preferably equal to or greater than about 60 phr up to a maximum value of about 160 phr.

According to a preferred embodiment, the predispersion of diene elastomeric polymer and lignin is added to the elastomeric composition in an amount such as to provide the elastomeric composition itself from 100 to 20 phr of diene elastomeric polymer, advantageously from 100 to 30 phr of diene elastomeric polymer, the balance to 100 phr being provided by the separately added diene elastomeric polymer.

According to the invention at least 50 phr, preferably at least 60 phr, more preferably at least 70 phr, and even more preferably at least 80 phr of the diene elastomeric polymer of the elastomeric composition consists of natural or synthetic isoprene rubber, preferably natural. Advantageously, the resulting elastomeric composition comprises from 90 phr to 100 phr of natural or synthetic isoprene rubber, preferably natural.

According to a preferred embodiment, the predispersion of diene elastomeric polymer and lignin is added to the elastomeric composition in an amount such as to provide to the elastomeric composition itself at least 26, 27, 28, 29 or 30 phr of lignin, preferably between 30 phr and 60 phr of lignin, advantageously between 30 phr and 50 phr of lignin.

Preferably, the lignin is selected from the group comprising Softwood Kraft lignin, Hardwood Kraft lignin, Soda Grass lignin, Wheat Straw lignin, Rice Husk lignin, lignin obtained through biorefinery processes, Organosolv lignin.

Preferably, the predispersion of diene elastomeric polymer and lignin is prepared according to the process described in WO2017/109672 or IT102020000032627.

In particular, in an embodiment as described in WO2017/109672, the predispersion of diene elastomeric polymer and lignin is obtained with a process comprising:
(a) adding lignin to a natural rubber latex,
(b) causing the co-precipitation (coagulation) of the predispersion of natural rubber and lignin from the mixture resulting from step (a), and
(c) separating the predispersion of natural rubber and lignin obtained from step (b) from a residual supernatant.

Preferably, the lignin is solubilised in an alkaline solution before being added to the natural rubber latex.

In particular, the alkaline solution comprises an aqueous solution of a base, preferably selected from the group comprising hydroxides of alkali metals, such as, for example, sodium hydroxide (NaOH) or potassium hydroxide (KOH), and ammonia (NH$_3$), in concentration between 0.01M and 1M, preferably between 0.1M and 0.5M. The basic conditions of the solution ensure deprotonation of the lignin acid groups (phenols and carboxylic acids), and the negative charges make the lignin macromolecules soluble and stable in aqueous solution. The addition of the lignin to the basic solution is preferably carried out under stirring and at room temperature until complete solubilisation.

The addition of the lignin to the latex is preferably carried out slowly and under stirring, and at room temperature, in a variable time, preferably between 5 and 15 minutes, and the resulting mixture is left under stirring at room temperature for a variable time, preferably between 1 and 2 hours.

Co-precipitation (coagulation) from the resulting mixture occurs by adding an acid solution.

In particular, the acid solution comprises an aqueous solution of an acid, preferably selected from the group comprising inorganic acids, such as for example hydrochloric or sulphuric acid, and organic acids, such as for example acetic acid, in a concentration comprised between 0.1M and 2M, preferably between 0.5M and 1.5M.

Advantageously, in another embodiment as described in IT102020000032627, the predispersion of diene elastomeric polymer and lignin is obtained with a process comprising:
a) preparing in a dispersing liquid a first suspension of lignin having a value of a median particle diameter D50 equal to or less than 10 microns, preferably equal to or less than 5 microns, more preferably, equal to or less than 2 microns;
b) preparing a second suspension comprising lignin and diene elastomeric polymer latex by mixing the first lignin suspension obtained from step a) with said latex; and
c) removing the dispersing liquid from said second suspension comprising lignin and diene elastomeric polymer latex until said predispersion of diene elastomeric polymer and lignin is obtained.

In a particularly preferred embodiment, step a) of preparing said first lignin suspension comprises
a1) preparing in the dispersing liquid a crude suspension of lignin having a value of a median particle diameter D50 equal to or greater than 10 microns, more preferably equal to or greater than 20 microns;
a2) wet-grinding the lignin particles contained in said crude suspension until the median diameter D50 of the lignin particles is reduced to said value equal to or less than 10 microns.

In preferred embodiments, in the process of preparing a predispersion of a diene elastomeric polymer and lignin, step a) of preparing the first lignin suspension or step a1) of preparing the crude lignin suspension comprises adding to such suspension a metered amount of at least one surfactant.

Preferably, the surfactant is an anionic surfactant, such as sodium lauryl sulphate (SLS), lauryl ethoxy sulphate (LES), alkyl-benzene-sulphonic acids (ABS) and salts thereof. More preferably, the surfactant is sodium dodecylbenzene-sulphonate, a widely available low cost anionic surfactant.

Preferably, step a) of preparing the first lignin suspension or step a1) of preparing the crude lignin suspension comprises adding to the first lignin suspension an amount of surfactant comprised between 0.1 and 60 parts by weight, preferably between 1 and 10 parts by weight, per 100 parts by weight of total suspension.

Preferably, the first lignin suspension or the aforementioned crude lignin suspension has a solid residue comprised between 20% and 80% by weight, preferably between 30% and 70% by weight, with respect to the overall weight of the suspension.

In a preferred embodiment, the crude suspension of lignin may be obtained by diluting lignin having a moisture content of between 1 and 60% with a suitable amount of liquid dispersant in order to obtain a suspension with a solid residue of between 20% and 80% by weight, more preferably of between 30% and 70% by weight with respect to the total weight of the crude suspension.

Preferably, step a2) of the aforementioned preferred predispersion preparation process involves wet-grinding the lignin particles contained in the crude lignin suspension until the median diameter D50 of the lignin particles is reduced to a value equal to or less than 5 microns, more preferably equal to or less than 2 microns.

Preferably, the first lignin suspension obtained from step a) has a % by weight of particles having a size greater than 10 microns equal to or less than 10% by weight, more preferably, equal to or less than 2% by weight.

In a preferred embodiment, step a2) of wet-grinding the lignin particles contained in the crude lignin suspension is carried out by means of a grinding apparatus selected from ball mills, hammer mills, blade mills, roller mills, high-pressure compression mills, ring mills, vibrating rod or tube mills, centrifugal fluid mills, preferably ball mills.

Preferably, the diene elastomeric polymer latex has a solid residue of between 10% and 80% by weight, more preferably between 50% and 70% by weight, with respect to the total weight of the latex.

Preferably, the diene elastomeric polymer latex is stabilised with a weak base, for example ammonia.

Preferably, step b) of preparing the second suspension comprising lignin and diene elastomeric polymer latex is carried out by mixing from 30 to 200 parts by weight, preferably from 60 to 140 parts by weight, of the first lignin suspension obtained from step a) to 100 parts by weight of diene elastomeric polymer latex.

In a particularly preferred embodiment, step b) of preparing the second suspension comprising lignin and diene elastomeric polymer latex is carried out by mixing the first lignin suspension obtained from step a) with said latex for a time such as to obtain a substantially homogeneous second suspension.

Preferably, the mixing time is between 5 minutes and 120 minutes.

In a preferred embodiment, the mixing contemplated in step b) is carried out by means of a batch mixer with mechanical stirrer.

Preferably, step c) of removing the dispersing liquid from the second suspension comprising lignin and diene elastomeric polymer latex comprises d) drying the second suspension.

Preferably, step d) of drying the second suspension comprising lignin and diene elastomeric polymer latex is carried out until a moisture content of the predispersion of diene elastomeric polymer and lignin is brought to a value equal to or less than 5% by weight, preferably equal or less than 1% by weight.

Preferably, step d) of drying the second suspension comprising lignin and diene elastomeric polymer latex is carried out in a static oven at a temperature of between 4° and 120° C., for example 60° C., for a time between 2 and 30 hours.

In an alternative embodiment, step c) of removing the dispersing liquid from the second suspension comprising lignin and diene elastomeric polymer latex may comprise a step e) of removing part of the dispersing liquid, for example by filtration or centrifugation or decantation, before drying said second suspension.

In a preferred embodiment, the process of preparing the predispersion of diene elastomeric polymer and lignin may comprise a step f) of compacting the predispersion of diene elastomeric polymer and lignin obtained from step c).

Advantageously, this compacting step may be carried out by means of apparatuses normally used in the rubber field, such as, for example, an open roller mixer (open mill) or an internal mixer.

In this way, it is possible to obtain a semi-finished product in the form of a sheet which may be subsequently used in the operations for the production of the vulcanisable elastomeric composition which will be better described below.

Alternatively, the predispersion of diene elastomeric polymer and lignin may be used in the form of bales as conventionally occurs in the case of compositions based on elastomeric polymer.

Diene Elastomeric Polymer

The diene elastomeric polymer that is used in the present invention may be selected from those commonly used in sulphur-cross-linkable elastomeric materials, which are particularly suitable for producing tires, i.e. from elastomeric polymers or copolymers with an unsaturated chain characterised by a glass transition temperature (Tg) generally lower than 20° C., preferably in the range of from 0° C. to −110° C. These polymers or copolymers may be of natural origin or may be obtained by solution polymerisation, emulsion polymerisation or gas-phase polymerisation of one or more conjugated diolefins, optionally mixed with at least one comonomer selected from monovinylarenes and/or polar comonomers.

The conjugated diolefins generally contain from 4 to 12, preferably from 4 to 8 carbon atoms and may be selected, for example, from the group comprising: 1,3-butadiene, isoprene, 2,3-dimethyl-1,3-butadiene, 1,3-pentadiene, 1,3-hexadiene, 3-butyl-1,3-octadiene, 2-phenyl-1,3-butadiene or mixtures thereof. 1,3-butadiene and isoprene are particularly preferred.

Monovinylarenes, which may optionally be used as comonomers, generally contain from 8 to 20, preferably from 8 to 12 carbon atoms and may be selected, for example, from: styrene; 1-vinylnaphthalene; 2-vinylnaphthalene; various alkyl, cycloalkyl, aryl, alkylaryl or arylalkyl derivatives of styrene, such as, for example, α-methylstyrene, 3-methylstyrene, 4-propylstyrene, 4-cyclohexylstyrene, 4-dodecylstyrene, 2-ethyl-4-benzylstyrene, 4-p-tolyl-styrene, 4-(4-phenylbutyl) styrene, or mixtures thereof. Styrene is particularly preferred.

Polar comonomers that may optionally be used, can be selected, for example, from: vinylpyridine, vinylquinoline, acrylic acid and alkylacrylic acid esters, nitriles, or mixtures thereof, such as, for example, methyl acrylate, ethyl acrylate, methyl methacrylate, ethyl methacrylate, acrylonitrile or mixtures thereof.

Preferably, the diene elastomeric polymer which can be used in the present invention can be selected, for example, from: cis-1,4-polyisoprene (natural or synthetic, preferably natural rubber), 3,4-polyisoprene, polybutadiene (in particular polybutadiene with a high content of 1,4-cis), optionally halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, or mixtures thereof.

A diene elastomeric polymer functionalised by reaction with suitable terminating agents or coupling agents may also be used. In particular, the diene elastomeric polymers obtained by anionic polymerization in the presence of an organometallic initiator (in particular, an organolithium initiator) may be functionalised by reacting the residual organometallic groups derived from the initiator with suitable terminating agents or coupling agents such as, for example, imines, carbodiimides, alkyltin halides, substituted benzophenones, alkoxysilanes or aryloxysilanes.

Carbon Black.

According to a preferred embodiment, the carbon black reinforcing filler which may be used in the present invention may be selected from those having a surface area of not less than 20 $m^2/g$ (as determined by STSA-Statistical Thickness Surface Area-according to ISO 18852:2005).

According to a preferred embodiment, the carbon black reinforcing filler is present in the elastomeric composition in an amount greater than about 15 phr, preferably greater than about 20 phr. Preferably, the carbon black reinforcing filler is present in the elastomeric composition in an amount of less than about 60 phr, preferably less than about 50 phr.

At least one additional reinforcing filler may advantageously be added to the elastomeric composition reported above, in an amount generally comprised between 1 phr and 70 phr, preferably between about 10 phr and about 60 phr. The reinforcing filler may be selected from those commonly used for cross-linked products, in particular for tires, such as silica, alumina, aluminosilicates, calcium carbonate, kaolin or mixtures thereof.

The silica that may be used in the present invention may generally be a pyrogenic silica or, preferably a precipitated silica, with a BET surface area (measured according to the ISO 5794/1 Standard) of between about 50 $m^2/g$ and about 500 $m^2/g$, preferably between about 70 $m^2/g$ and about 200 $m^2/g$.

Reinforcing Resin

Optionally, the elastomeric composition useful in the present invention comprises a reinforcing resin comprising at least 1 phr of a methylene acceptor compound associated with at least 1 phr of a methylene donor compound.

According to a preferred embodiment, the reinforcing resin comprises at least 2 phr of a methylene acceptor compound associated with at least 2 phr of a methylene donor compound.

Preferably, the amount of methylene acceptor compound is less than 25 phr, preferably less than 20 phr.

Preferably, the amount of methylene donor compound is less than 15 phr, preferably less than 10 phr.

Advantageously, the amount of methylene acceptor compound is comprised between 2.5 phr and 15 phr.

Advantageously, the amount of methylene donor compound is comprised between 2.5 phr and 10 phr.

Preferably, the methylene acceptor compound is selected from the group consisting of resorcinol; catechol; hydroquinone; pyrogallol; phloroglucinol; 1-naphthol; 2-naphthol, phenolic resins obtained from the condensation of a phenol, optionally substituted, with an aldehyde such as, for example, formaldehyde, acetaldehyde, furfural (for example, resorcinol-formaldehyde resin); modified phenolic resins; phenolic resins derived from products of natural origin, typically from cashew oil or tallow oil; mixtures of the aforesaid compounds. Solid phenolic resins of the novolac type, i.e. with an aldehyde:phenol molar ratio of less than 1, are particularly preferred.

Preferably, the methylene donor compound is selected from the group consisting of hexamethylenetetramine (HMT); hexamethoxymethylmelamine (HMMM); formaldehyde; paraformaldehyde; trioxane; 2-methyl-2-nitro-1-propanal; substituted melamine resins, such as N-substituted oxymethylmelamine resins; glycoluryl compounds such as tetramethoxymethyl glycoluryl; urea-formaldehyde resins such as butylated urea-formaldehyde resins; or mixtures thereof. Hexamethylenetetramine (HMT) and hexamethoxymethylmelamine (HMMM) are particularly preferred.

Vulcanising Agent

The elastomeric composition may be vulcanised according to known techniques, in particular with sulphur-based vulcanising systems commonly used for diene elastomeric polymers. To this end, in the elastomeric compound obtained from the elastomeric composition after one or more thermomechanical treatment steps, a sulphur-based vulcanising agent is incorporated together with vulcanisation accelerants. In the final treatment step, the temperature is generally kept below 120° C. and preferably below 100° C., so as to prevent any undesired pre-cross-linking phenomena.

Preferably, said vulcanising agent comprises sulphur-based vulcanising systems comprising sulphur or sulphur-containing molecules (sulphur donors) together with vulcanisation accelerants and/or activators known in the art.

Activators that are particularly effective are zinc compounds, and in particular ZnO, $ZnCO_3$, zinc salts of saturated or unsaturated fatty acids containing from 8 to 18 carbon atoms, such as, for example, zinc stearate, which are preferably formed in situ in the elastomeric composition from ZnO and fatty acid, or mixtures thereof.

The accelerants which are commonly used may be selected from: dithiocarbamates, guanidine, thiourea, thiazoles, sulphenamides, thiurams, amines, xanthates or mixtures thereof.

According to a preferred embodiment, said cross-linkable elastomeric composition comprises an amount of vulcanising agent equal to or greater than about 1 phr, preferably equal to or greater than about 2 phr.

Preferably, the amount of vulcanising agent is less than or equal to about 7.5 phr, preferably less than or equal to about 7.

Advantageously, the amount of sulphur is between about 2 phr and about 6.5 phr.

Other Additives

According to an embodiment, the elastomeric composition may comprise a silane coupling agent able to interact with the silica possibly present as reinforcing filler and/or the silicates and to bind it to the diene elastomeric polymer during the vulcanisation.

According to an embodiment, the silane coupling agent which may be used in the present invention may be selected from those having at least one hydrolysable silane group, which may be identified, for example, by the following general formula (II):

$(R)_3Si—CnH_{2n}—X$      (II)

where the R groups, which may be the same or different, are selected from: alkyl, alkoxy or aryloxy groups or from halogen atoms, provided that at least one of the R groups is an alkoxy or aryloxy group; n is an integer of between 1 and 6, inclusive; X is a group selected from: nitrous, mercapto, amino, epoxide, vinyl, imide, chlorine, $—(S)_mC_nH_{2n}—Si—(R)_3$ and $—S—COR$, where m and n are integers of between 1 and 6 inclusive and the R groups are as defined above.

Among the silane coupling agents, bis(3-triethoxysilyl-propyl)tetrasulphide and bis(3-triethoxysilylpropyl)disulphide are particularly preferred. Said coupling agents may be used as such or as a suitable mixture with an inert filler (such as carbon black) so as to facilitate their incorporation into the elastomeric composition.

According to an embodiment, said silane coupling agent may be present in the elastomeric composition in an amount ranging between 0.01 phr and about 10 phr, preferably between about 0.5 phr and about 5 phr.

Said elastomeric composition may comprise other commonly used additives, selected on the basis of the specific application for which the composition is intended. For example, said materials may be admixed with: antioxidants, anti-ageing agents, plasticisers, adhesives, anti-ozone agents, modifying resins, or mixtures thereof.

In particular, in order to improve the processability, said vulcanisable elastomeric composition may be admixed with a plasticiser generally selected from mineral oils, vegetable oils, synthetic oils or mixtures thereof, such as, for example, aromatic oil, naphthenic oil, phthalates, soybean oil or mixtures thereof. The amount of plasticiser generally ranges from 0 phr and about 70 phr, preferably from about 5 phr to about 30 phr.

Preparation of the Elastomeric Composition

The elastomeric composition may be prepared by mixing the necessary amount of diene elastomeric polymer with the predispersion of diene elastomeric polymer and lignin, the reinforcing filler, the vulcanising agent, and with the reinforcing resin and any other additives possibly present according to the techniques known in the industry.

According to the invention at least 50 phr, preferably at least 60 phr, more preferably at least 70 phr, and even more preferably at least 80 phr of the diene elastomeric polymer of the elastomeric composition consists of natural or synthetic isoprene rubber, preferably natural. Advantageously, the resulting elastomeric composition comprises from 90 phr to 100 phr of natural or synthetic isoprene rubber, preferably natural.

The mixing may be carried out, for example, using at least one batch mixer and/or at least one continuous mixer.

The predispersion of a diene elastomeric polymer and lignin may be fed to said at least one batch mixer and/or at least one continuous mixer according to any method known to those skilled in the art and suitable for the purpose.

For example, the predispersion may be fed in the form of material in bales or sheets obtained as described above in the process for preparing the predispersion.

In the context of the present description and the subsequent claims, the term "batch mixer (or mixing device)" indicates a mixing device configured to be periodically fed with the various ingredients of the material to be prepared in predefined amounts and for mixing them for a predetermined time in order to obtain a batch of said material.

At the end of the mixing step, the entire batch of material obtained is completely discharged from the mixing device in a single solution. Examples of batch mixers are internal mixers of the type with tangential rotors (Banbury®) or with interpenetrating rotors (Intermix®).

In the context of the present description and of the subsequent claims, the term "continuous mixer (or mixing device)" indicates a mixing device configured to continuously feed the ingredients of the material to be prepared, typically by means of controlled dosage dispensers, to mix the ingredients in order to produce the material and to discharge it in a continuous flow (except possible stoppages of the mixing device due to maintenance, or change of the recipe of the material).

In the jargon of the elastomeric mixers sector, the continuous mixing device is sometimes referred to as: "mixing extruder", which is herein considered equivalent to a "continuous mixer".

The continuous mixer (in particular its active elements, such as screws or mixer satellites) is then provided with mixing portions able to impart a high shear stress to the material being mixed and, alternating with the mixing portions, transport portions able to impart a thrust to the material being processed to feed it from one longitudinal end to the other of the inner chamber. It may further be provided with possible redistribution portions.

Examples of continuous mixing devices are twin-screw or multi-screw mixers (e.g. ring mixers), co-penetrating and co-rotating, or planetary mixing devices.

Both the batch mixer and the continuous mixer are able to impart to the material to be produced with them sufficient energy to mix and homogeneously disperse the various components even in the case of cold feeding of the ingredients and, in the case of a material comprising an elastomeric component, to chew the elastomeric compound raising the temperature thereof so as to make it workable and plastic to facilitate the incorporation and/or distribution of the ingredients within the elastomeric polymeric matrix.

The elastomeric compound thus obtained may then be stored or sent directly to the subsequent production steps of the tire according to the present invention.

The Reinforcing Element

The reinforcing element according to the invention consists of an elongate member immersed in a vulcanised elastomeric compound obtained by vulcanising the elastomeric composition according to the invention described above.

The elongate member is also referred to as reinforcing cord or cord.

The elongate member may be made of polymeric or metallic materials.

The elongate member in polymeric material (also referred to as textile) is generally made with polyester, rayon, lyocell and polyamide threads, while the elongate member in metal is generally made with steel wires, preferably coated with a metal alloy, such as copper/zinc, zinc/manganese, zinc/molybdenum/cobalt alloys, and the like.

The elongate member may consist of a single thread, and in this case it is called "monofilament", or of a plurality of threads, and in this case it is called "multifilament".

The elongate member may comprise a single end or two or more ends stranded together, where by "end" it is meant a bundle of twisted filaments. Preferably, a single end or at least two ends twisted together are provided.

The elongate member may be made with different materials, for example it may be made with at least one metallic thread twisted with at least one textile yarn, in which case one speaks of "hybrid elongate member" or "hybrid reinforcing cord", or it may be made with at least one low modulus textile yarn, such as a nylon yarn, twisted with at least one high modulus textile yarn, such as an aramid yarn, in which case one speaks of a "mixed elongate member" or "mixed reinforcing cord".

The "modulus" of a textile cord or yarn is intended to indicate the ratio between toughness (load or force normalised to linear density) and elongation measured at any point of a toughness-elongation curve according to the BISFA standard. This curve is plotted by calculating the first derivative of the toughness-elongation function that defines the aforementioned curve, where the linear density is expressed in Tex. The modulus it is therefore expressed in cN/Tex. In a toughness-elongation graph, the modulus is identified by the slope of the aforementioned curve with respect to the abscissa axis.

By "high modulus" it is meant an initial modulus equal to or greater than 3000 cN/Tex. By "low modulus" it is meant an initial modulus of less than 3000 cN/Tex.

For the measurement of the modulus reference to flat threads/yarns, without twists applied in the test step or in the twisting step, according to the tests regulated by the BISFA.

The elongate member may comprise polymeric and/or metal threads coupled in differently twisted ends. The term "twisting" (or spinning) indicates the spiral winding of the fibres that make up a yarn, if it is single end, or of the component elements (ends) if it is twisted.

The textile-type elongate member is identified with a numerical code that represents the title of the fibre used, the number of ends that contribute to forming the reinforcing element, the twists and winding directions of the individual ends, the twists and the total winding direction of the final member.

By way of example, in the expressions (38×38), (25×25) and in general (n×n), the first number indicates the twists imparted to the yarn or set of yarns or to the end and the second number indicates the twists imparted to the cord after having coupled the ends, expressed in twists per decimetre (dm).

Preferably, the twist imparted respectively to each end and to the set of the ends forming the cord is between 20 and 55 twists per decimetre, equivalent to 200 TPM-550 TPM (Twist Per Metre).

The elongate member of the textile type is also identified with the title or linear density, expressed in dtex, or mass expressed in grams of a 10000 m long thread. The term "linear density" or "title" of an elongate member or of a thread or of an end indicates the weight of the elongate member or of the thread or of the end per unit of length. For the measurement of linear density we refer to flat threads/yarns, without twists applied in the test step or in the twisting step, according to the tests regulated by the BISFA (Bureau International pour la Standardisation des Fibres Artificielles).

By way of example, the title of the elongate member may be between 900/n dtex and 12000/n dtex, where n is an integer from 1 to 3, and represents the number of yarn strands twisted together.

The elongate member may be used as it is or be woven into plies, made by interweaving elongate members in the warp with elongate members in the weft. The number of elongate members in the carcass ply arranged per decimetre (also called density), measured along a circumferential direction, is generally between 60 cords/dm and 130 cords/dm, between about 80 and about 120, preferably between about 90 and about 110.

The density of the textile elongate reinforcing elements in the fabric is typically expressed with the identifier F followed by the number of cords arranged per decimetre.

The elongate member or the fabric made with it is subjected to a treatment with a suitable adhesive composition to make it more compatible with the elastomeric composition comprising a predispersion of a diene elastomeric polymer and lignin according to the invention. Typically, the adhesive comprises resorcinol, formaldehyde and latex but any type of adhesive suitable for compatibilising the elongate member or the fabric can equally be used.

Typically, the adhesive is applied by dipping or by spraying, but it is also possible to apply it according to other suitable known techniques.

The elongate member or the fabric made with it may be treated superficially by immersing them in a solution containing said mixture of resorcinol-formaldehyde resin and rubber latex (this mixture being commonly referred to with the expression "resorcinol-formaldehyde latex RFL"), and subsequently subjected to drying. The latex used may be selected, for example, from: vinylpyridine/styrene-butadiene (VP/SBR), styrene-butadiene (SBR), natural rubber latex (NR), carboxylated and hydrogenated acrylonitrile-butadiene (X-HNBR), hydrogenated acrylonitrile (HNBR), acrylonitrile (NBR), ethylene-propylene-diene monomer (EPDM), chlorosulphonated polyethylene (CSM) or a mixture thereof.

Some materials, such as rayon, already acquire optimal properties for adhesion with the elastomeric composition through a single immersion in an RFL-based bath (dipping, one-step process) while others, such as polyesters or aromatic polyamides, bind with greater difficulty to the elastomeric composition and therefore take advantage of particular activating pretreatments of a physical or chemical nature. For example, the elongate members in polyester or aromatic polyamides are preferably subjected to a surface pre-activation by pre-treatment with a first activating bath (pre-dipping, two-step process) or by ionising ray pre-treatments, with plasma or with solvents.

Generally, after the application of the adhesive, the solvent, typically water, is dried at temperatures around 180° C., with a second heating step around 235° C.-240° C., to partially cross-link the adhesive, and to a final step of relaxation of the material at slightly lower temperatures (for example at 230° C.) by slightly reducing the stretching ratios.

The elongate member or the fabric made with it are subsequently subjected to a rubberising operation in which the fibrous material possibly previously impregnated with adhesive agents is then coupled to the elastomeric composition according to the present invention by heating and, preferably, compression according to rubberising processes typically adopted in tire technology, for example by extrusion or calendaring or according to suitable alternative techniques such as solvent casting or spray coating, by means of which they are coated with, or incorporated into, the elastomeric composition comprising a predispersion of a diene elastomeric polymer and lignin according to the invention.

The Tire

According to an embodiment, the tire for vehicle wheels according to the invention comprises
- a carcass structure comprising at least a carcass ply having opposite lateral edges associated to respective bead structures;
- optionally a belt structure applied in radially external position with respect to the carcass structure;
- a tread band applied in a radially external position to said carcass structure and to said belt structure, if present, and
- optionally, an underlayer and/or an anti-abrasive elongate member and/or a sidewall and/or a sidewall insert and/or a mini-sidewall and/or an underliner and/or a rubberising layer and/or flipper and/or chafer and/or a bead filler and/or a sheet.

According to an embodiment, the structural component according to the invention is selected from the group consisting of carcass structure, belt structure, additional belt layer, rubberising layer, sidewall and bead reinforcement layers (chafer and flipper).

According to a preferred embodiment, said structural component is an additional belt layer. Said additional belt layer is commonly known as a "zero degree belt".

In the tire according to the invention, the reinforcing elements according to the invention may be used in the carcass structure, and/or in the crossed belt structure and/or in one or both of the flipper and chafer components (if provided).

The carcass structure is intended to give the tire the desired features of structural integrity and strength, while the belt structure is also intended to transfer to the carcass structure the lateral and longitudinal stresses to which the running tire is subjected as a result of the contact with the road surface, so as to impart the desired performance of grip, driving stability, controllability, directionality, road grip and comfort. The zero degree reinforcing layer, when present, is instead intended to limit the radial elongation of the belt structure.

Preferably, said structural component is the carcass structure comprising a plurality of reinforcing elements according to the invention. Preferably, said carcass structure is a radial carcass structure.

Preferably, the plurality of reinforcing elements is incorporated in two carcass plies radially superimposed on each other.

Preferably, the belt structure comprises at least one reinforcing element according to the invention wound on the carcass structure according to a substantially circumferential winding direction.

In one embodiment, at least one bead reinforcement layer may be associated with the carcass layer at or in proximity to a respective anchoring structure.

Preferably, said at least one bead reinforcement layer comprises at least one reinforcing element according to the invention.

Said at least one bead reinforcement layer may be interposed between a respective turned up end flap of said at least one carcass layer and a respective anchoring structure.

More preferably, said at least one bead reinforcement layer may at least partially surround said anchoring structure or bead. This bead reinforcement layer is also referred to by the term "flipper".

A sidewall reinforcement layer may be associated with the respective turned up end flap of the at least one carcass layer in an axially outermost position with respect to the respective annular anchoring structure.

More preferably, said at least one sidewall reinforcement layer may extend from said carcass structure along the sidewall towards the tread band. Such sidewall reinforcement layer is also referred to by the term "chafer".

In a preferred embodiment, the structural component according to the invention is selected from the group consisting of carcass structure, belt structure, flipper, chafer, and rubberising layers.

The tire according to the invention may be used on two, three or four-wheeled vehicles. The tire according to the invention may be for summer or winter use or for all seasons.

The tire according to the invention may be a tire for passenger cars, including both automobile tires, such as for example the high-performance tires, and tires for light transport vehicles, for example vans, campers, pick-up, typically with total mass at full load equal to or less than 3500 kg. Therefore, tires for heavy transport vehicles are excluded.

The tire according to the invention may be a tire for motorcycles, such as for example motorcycles belonging to the scooter, road enduro, custom, hypersport, supersport, and sport touring categories. The term "tire for motorcycle wheels" means a tire having a high curvature ratio (typically greater than 0.200), capable of reaching high angles of inclination (roll angles) during cornering of the motorcycle.

DRAWINGS

The description is given hereinafter with reference to the accompanying drawings, provided only for illustrative and, therefore, non-limiting purposes, in which:

FIG. 1 schematically shows a semi-sectional view of a tire for vehicle wheels according to the present invention.

DETAILED DESCRIPTION OF THE INVENTION

The present invention will be illustrated in further detail by means of an illustrative embodiment with reference to the accompanying FIG. 1, where "a" indicates an axial direction and "r" indicates a radial direction. For simplicity, FIG. 1 shows only a part of the tire, the remaining part not shown being identical and disposed symmetrically with respect to the radial direction "r".

The reference numeral 100 indicates in FIG. 1 a tire for vehicle wheels, which generally comprises a carcass structure 101 having respectively opposite end flaps engaged with respective annular anchoring structures 102, called bead cores, possibly associated with a bead filler 104. The tire area comprising the bead core 102 and the filler 104 forms a bead structure 103 intended for anchoring the tire onto a corresponding mounting rim, not shown. Each bead structure 103 is associated to the carcass structure by folding back of the opposite lateral edges of the at least one carcass layer 101 around the bead core 102 so as to form the so-called carcass flaps 101a as shown in FIG. 1.

The carcass structure 101 is possibly associated with a belt structure 106 comprising one or more belt layers 106a, 106b placed in radial superposition with respect to one another and with respect to the carcass structure 101, having typically metal reinforcing cords. Such reinforcing cords may have crossed orientation with respect to a circumferential extension direction of the tire 100. By "circumferential" direction we mean a direction generally facing according to the direction of rotation of the tire, or in any case slightly inclined with respect to the direction of rotation of the tire.

The belt structure 106 further comprises at least one radially external reinforcing layer 106c with respect to the belt layers 106a, 106b. The radially external reinforcing layer 106c comprises textile or metal cords, disposed according to a substantially zero angle with respect to the circumferential extension direction of the tire and immersed in the elastomeric material. Preferably, the cords are disposed substantially parallel and side by side to form a plurality of turns. Such turns are substantially oriented according to the circumferential direction (typically with an angle of between 0° and) 5°, such direction being usually called "zero degrees" with reference to the laying thereof with respect to the equatorial plane X-X of the tire. By "equatorial plane" of the tire it is meant a plane perpendicular to the axis of rotation of the tire and which divides the tire into two symmetrically equal parts.

A tread band 109 of a vulcanised elastomeric compound is applied in a radially internal position with respect to the carcass structure 101 and/or if present (as in the illustrated case) to the belt structure 106.

In a radially external position, the tread band 109 has a rolling portion 109a intended to come into contact with the ground. Circumferential grooves, which are connected by transverse notches (not shown in FIG. 1) so as to define a plurality of blocks of various shapes and sizes distributed in the rolling portion 109a, are generally made in this portion 109a, which for simplicity is represented smooth in FIG. 1.

To optimise the performance of the tread, the tread band may be made in a two-layer structure.

Such two-layer structure comprises the rolling layer or portion 109a (called cap) and a substrate 111 (called base) forming the so-called cap-and-base structure. It is thus possible to use an elastomeric material capable of providing a low rolling resistance for the cap 109a and at the same time high resistance to wear and to the formation of cracks while the elastomeric material of the substrate 111 may be particularly aimed at a low hysteresis to cooperate in reducing rolling resistance. The under-layer 111 of vulcanised elastomeric compound may be disposed between the belt structure 106 and the rolling portion 109a.

Moreover, respective sidewalls 108 of vulcanised elastomeric compound are further applied in an axially external position to said carcass structure 101, each extending from one of the lateral edges of the tread band 109 up to the respective bead structure 103.

A strip consisting of elastomeric compound 110, commonly known as "mini-sidewall", of vulcanised elastomeric compound may optionally be provided in the connecting zone between sidewalls 108 and the tread band 109, this mini-sidewall generally being obtained by co-extrusion with the tread band 109 and allowing an improvement of the mechanical interaction between the tread band 109 and the sidewalls 108. Preferably, the end portion of sidewall 108 directly covers the lateral edge of the tread band 109.

In some specific embodiments, such as the one illustrated and described herein, the stiffness of the bead 103 may be improved by providing a reinforcing layer 120 generally known as a "flipper" in the tire bead.

The flipper 120 is wrapped around the respective bead core 102 and the bead filler 104 so as to at least partially surround them. The flipper 120 is disposed between the carcass layer 101 and the bead structure 103. Usually, the flipper 120 is in contact with the carcass layer 101 and said bead structure 103. The flipper 120 typically comprises a plurality of metal or textile cords incorporated in a vulcanised elastomeric compound.

In some specific embodiments, such as the one illustrated and described herein, the bead structure 103 may further comprise a further reinforcing layer 121 which is generally known by the term of "chafer" and which has the function to increase the rigidity and integrity of the bead structure 103.

The chafer 121 usually comprises a plurality of cords incorporated in a vulcanised elastomeric compound; such cords are generally made of textile material (for example aramid or rayon), or of metallic material (for example steel cords).

Optionally, an anti-abrasive strip 105 is disposed so as to wrap the bead structure 103 along the axially internal and external and radially internal areas of the bead structure 103, thus interposing itself between the latter and the wheel rim when the tire 100 is mounted on the rim.

Moreover, a radially internal surface of tire 100 is preferably internally lined by a layer of substantially airtight elastomeric material, or so-called liner 112.

According to an embodiment not shown, the tire may be a tire for motorcycle wheels. The profile of the straight section of the tire for motorcycle (not shown) has a high transversal curvature since it must guarantee a sufficient footprint area in all the inclination conditions of the motorcycle. The transverse curvature is defined by the value of the ratio between the distance f of the ridge of the tread from the line passing through the laterally opposite ends of the tread itself, measured on the equatorial plane of the tire, and the width C defined by the distance between the laterally opposite ends of the tread itself. A tire with high transverse curvature indicates a tire whose transverse curvature ratio (f/C) is at least 0.20.

The reinforcing elements of the belt structure 106, and/or of the carcass structure 101, and/or of the bead structure 103, such as the flipper 120 and/or the chafer 121, may be advantageously rubberised with the elastomeric composition comprising the predispersion of diene elastomeric polymer and lignin previously described, because a lower hysteresis means (i) a lower dissipation of energy in the form of heat during driving, preventing the onset of operating temperatures that are too high which may risk compromising the integrity of the tire, and (ii) lower fuel consumption.

The building of the tire 100 as described above is carried out by assembling respective semi-finished products onto a forming drum, not shown, by at least one assembly device.

At least a part of the components intended to form the carcass structure 101 of the tire 100 is built and/or assembled on the forming drum. More particularly, the forming drum is intended to first receive the possible liner 112, and then the carcass ply 101. Thereafter, devices non shown coaxially engage one of the annular anchoring structures 102 around each of the end flaps, position an external sleeve comprising the belt structure 106 and the tread band 109 in a coaxially centred position around the cylindrical carcass sleeve and shape the carcass sleeve according to a toroidal configuration through a radial expansion of the carcass ply 101, so as to cause the application thereof against a radially internal surface of the external sleeve.

After building of the green tire 100, a moulding and vulcanisation treatment is generally carried out in order to determine the structural stabilisation of the tire 100 through vulcanisation of the elastomeric compounds, as well as to impart a desired tread pattern on the tread band 109 and to impart any distinguishing graphic signs at the sidewalls 108.

The present invention will be further illustrated below by means of a number of preparatory examples, which are provided for indicative purposes only and without any limitation of the present invention.

Example 1

Preparation of Predispersions of a Diene Elastomeric Polymer and Lignin Comprising 40% w/w and 50% w/w Lignin Materials Lignin: UPM BioPiva™ 200 Softwood Kraft process lignin (UPM Biochemicals) having a median particle diameter D50 equal to or greater than 20 microns;

Diene elastomeric polymer: natural rubber from HA latex obtained by centrifugation and stabilised with ammonia (60% by weight-marketed by Von Bundit Co. Ltd.);

Anionic surfactant: technical grade sodium dodecylbenzenesulphonate, Thermo Fischer Scientific.

Predispersion 1 (40% w/w Lignin-67 phr)

The preparation procedure of the predispersion 1 was the following.

Step a1): 95 kg of wet lignin particles (solids content about 57%, starting D50 about 20 microns) were diluted in 95 kg of deionised water; subsequently, 2.85 kg of anionic surfactant were added and the mixture was stirred until homogeneous, thus obtaining 192.85 kg of a crude suspension of lignin SG having a solid lignin content of about 28% by weight.

Step a2): the lignin particles contained in the crude SG lignin suspension were wet-ground using a cylindrical mill model ZETA from NETZSCH (NETZSCH-Feinmahltechnik GmbH, Selb, Germany) using steel balls with a diameter of less than 4 mm, so as to reduce the median diameter D50 of the lignin particles to a value equal to or less than 1.5 microns. 192.85 kg of a first suspension S1 containing ground lignin (28% by weight) were thus obtained, in which the percentage of particles larger than 10 microns was less than about 2% by weight.

The median particle diameter D50 was measured with the Malvern Mastersizer 2000 laser analyser (Malvern Panalytical Ltd., Malvern, Great Britain).

Step b): the first suspension S1 containing ground lignin obtained from step a2) (192.85 kg) was mixed with 133.33 kg of natural rubber latex (solids content: 60% by weight) by mechanical stirrer, thus obtaining 326.18 kg of a second suspension S2 containing about 16.5% by weight of ground lignin and about 24.5% by weight of natural rubber.

Step c): the second suspension S2 containing ground lignin and natural rubber (326.18 kg) was then dried in a static oven at 60° C. for about 4 hours, until it reached a moisture content lower than 1% by weight.

The predispersion in flakes thus obtained was then subjected to a further compacting step by means of an open mixer with rollers spaced about 3 mm apart to obtain a predispersion or masterbatch in sheets of natural rubber at 60% and lignin at 40% by weight.

Predispersion 2 (50% w/w Lignin-100 phr)

For the preparation of Predispersion 2, the same procedure as for Predispersion 1 was followed, using in step b) 90 kg of natural rubber latex so as to vary the ratio between the amount of natural rubber and lignin incorporated in the final predispersion, containing in this case both natural rubber and lignin at 50% by weight.

Predispersion 3 (23% w/w Lignin-30 phr)

The preparation procedure of the predispersion 3 was the following.

Step a): 52.63 kg of wet lignin particles (solids content about 57%, starting D50 about 20 microns) were dissolved in 300 litres of 0.1M sodium hydroxide solution (NaOH), thus obtaining a crude lignin solution SG having a lignin content of about 30 kg.

Step b): the SG crude lignin solution was slowly added to 166.66 kg of natural rubber latex under stirring at room temperature; the latex used, of Thai origin, consisted of a latex concentrated by centrifugation at 60% of solid residue in rubber and stabilised with ammonia, produced and marketed by the company Von Bundit Co., Ltd; the mixture thus obtained was kept under vigorous stirring at room temperature for a period of time ranging from 1 to 2 hours.

Step c): the mixture obtained from step b) was acidified with a 10% sulphuric acid solution ($H_2SO_4$) causing the co-precipitation of natural rubber and lignin leaving a relatively clear and transparent supernatant; the precipitate of natural rubber and lignin was filtered and washed to eliminate residual salts and excess acid and then subjected to a further compacting step by means of an open mixer with rollers spaced about 3 mm apart to obtain a predispersion or masterbatch in sheets of 77% natural rubber and 23% lignin by weight.

Example 2

Use of the Predispersion 1 Prepared in Example 1 in the Preparation of an Elastomeric Compound The predispersion 1 containing lignin according to Example 1 was used to make a vulcanisable elastomeric compound. The vulcanisable elastomeric compound of the invention (INV1) was compared with a lignin-free vulcanisable elastomeric compound (C1), considered as a conventional reference for structural elements of tire, in particular reinforcing elements of the belt structure, of the carcass structure, and of the bead structure.

The following Table 1 shows the phr compositions of the vulcanisable elastomeric compounds C1 and INV1. Predispersion 1 is added in such amount as to provide 80 phr of natural rubber and 54 phr of lignin to the compound INV1.

TABLE 1

|  | C1 | INV1 |
|---|---|---|
| NR | 100 | 20 |
| Predispersion 1 | — | 134 |
| CB | 60 | 30 |
| ZnO | 6 | 6 |
| Stearic acid | 1.5 | 1.5 |
| 6PPD | 2 | 2 |
| HMMM 65% | 3 | 3 |
| Resorcinol 80% | 2 | 2 |
| PVI | 0.20 | 0.20 |
| TBBS | 1 | 1 |
| Insoluble sulphur 66% | 4.50 | 4.50 |

NR: coagulated natural rubber, obtained by coagulation of natural rubber latex HA obtained by centrifugation and stabilised with ammonia (60% by weight-marketed by Von Bundit Co. Ltd);
CB: Carbon Black, N326, Cabot Corporation;
ZnO: Zinc oxide, Zincol Ossidi;
Stearic acid: Stearin, Undesa;
6PPD: N-(1,3-dimethylbutyl)-N'-phenyl-p-phenylenediamine, Solutia Eastman;
HMMM 65%: Cyrez 963, Cytec;
Resorcinol 80%: Kraeber & Co.;
PVI: cyclohexylthiophthalimide, Santogard PVI;
TBBS: N-tert-butyl-2-benzothiazolsulphenamide, Vulkacit ® NZ/EGC, Lanxess;
Insoluble sulphur 66%: Sulphur, Redball Superfine, International Sulphur Inc.

All the components, with the exception of the sulphur, the vulcanisation accelerant (TBBS) and the vulcanisation retardant (PVI), were mixed in an internal mixer (Brabender) for about 10 minutes ($1^{st}$ step).

When the temperature of 135° C. was reached, the material was mixed for another minute and then discharged. The unfinished compound was left to rest for a day then the sulphur, the accelerant (TBBS) and the retarder (PVI) were added and the mixing was carried out in the same mixer at about 60° C. for 9 minutes ($2^{nd}$ step). Finally, the compound was vulcanised at 170° C. for 10 minutes, in order to be able to measure its static mechanical properties, while the dynamic mechanical properties were measured on the vulcanisable compound.

The static mechanical properties of the compounds C1 and INV1 were evaluated according to the ISO 37-2011 standard at 23° C., on 5 Dumbell specimens. In this way the following parameters were measured:
 load at 10% elongation (Ca0.1),
 load at 50% elongation (Ca0.5),
 load at 100% elongation (Ca1),
 load at 300% elongation (Ca3),
 breaking load (CR), and
 % elongation at break (AR).

The dynamic mechanical properties of shear and Tan delta dynamic modulus G' of compounds C1 and INV1 were evaluated using an Alpha Technologies R.P.A. 2000 oscillating chamber rheometer (Rubber Process Analyser) with chamber geometry as described in ASTM D6601-19 FIG. 1, applying the following method.

An approximately cylindrical test sample with a volume in the range from 4.6 to 5 cm3 was obtained by punching a sheet with a thickness of at least 5 mm of the green vulcanisable elastomeric composition to be characterised. Subsequently, the chambers of the R.P.A. 2000 were preliminarily preheated to 170° C.

The sample was loaded between the chambers of the rheometer and the chambers were closed. Between the sample of the green vulcanisable elastomeric composition and each chamber of the rheometer, two films were interposed to protect the chamber itself: in contact with the compound, a film of Nylon 6.6 cast about 25 microns thick and in contact with the chamber of the rheometer a polyester film about 23 microns thick. The sample was then vulcanised for a fixed time of 10 minutes at a temperature of 170° C. while recording the vulcanisation curve, i.e. subjecting the sample to a sinusoidal deformation of 7% amplitude and 1.67 Hz frequency for the entire duration of the vulcanisation.

The temperature of the rheometer was then brought to 70° C. After a total time of 10 minutes since the chamber temperature was set at 70° C., a sequence of dynamic measurements is performed at a constant temperature of 70° C. by sinusoidally stressing the sample in torsion at a fixed frequency of 100 Hz and amplitude progressively increasing from 0.3% to 10%, carrying out 10 stabilisation cycles and 10 measurement cycles for each condition.

Always keeping the temperature of the rheometer chambers at 70° C., a dynamic measurement is then carried out by sinusoidally stressing the sample in torsion at the fixed frequency of 100 Hz and amplitude of 9%, carrying out 10 stabilisation cycles and 20 measurement cycles.

In this way, the following parameters were measured as an average of what was recorded in the 20 measurement cycles:
  dynamic shear modulus G',
  variation of the dynamic shear modulus d_G' between an amplitude of the sample deformation of 0.5% and one of 10%;
  torsion tan delta, i.e. the ratio between the viscous elastic modulus G" and the dynamic elastic modulus G', at a deformation amplitude of 9% (hereinafter Tan delta (9%)).

The dynamic mechanical properties in tension-compression of the compounds C1 and INV1 were evaluated using an Instron model 1341 dynamic device in the tension-compression mode the following modes.

A test piece of vulcanised material (170° C. for 10 minutes) having a cylindrical shape (length=25 mm; diameter=18 mm), compressed preloaded up to a longitudinal deformation of 25% with respect to the initial length and maintained at the predetermined temperature (for example, 70° C.) for the entire duration of the test.

After a waiting time of 2 minutes followed by a mechanical pre-conditioning of 125 cycles at 100 Hz at 5% deformation amplitude with respect to the length under preload, the specimen was subjected to a dynamic sinusoidal stress having an amplitude of +3.5% of the length under pre-load, with a frequency of 100 Hz.

In this way the following parameters were measured:
  dynamic elastic modulus E',
  tan delta, i.e. the ratio between the viscous dynamic modulus E" and the dynamic elastic modulus E'.

The following Table 2 shows the results obtained from the characterisations carried out.

TABLE 2

|  | C1 | INV1 |
|---|---|---|
| Ca0.1 MPa | 1.19 | 0.82 |
| Ca0.5 MPa | 2.50 | 2.62 |
| Ca1 MPa | 4.35 | 4.76 |
| Ca3 MPa | 17.91 | 11.60 |
| CR MPa | 20.03 | 14.98 |
| AR % | 329.60 | 376.02 |
| d_G'(0.5-10) (MPa) | 2.96 | 1.14 |
| G' (9%) (MPa) | 2.39 | 1.51 |
| Tan Delta (9%) | 0.16 | 0.14 |
| E' MPa | 8.63 | 8.35 |
| Tan Delta | 0.140 | 0.073 |

The results of Table 2 showed that the compound of the invention (INV1), comprising the predispersion 1 in partial replacement of the carbon black, exhibited a surprising and significant reduction in hysteresis (equal to about 50% with respect to the reference value) with the same stiffness. The lower value of the breaking load was due to the larger size of the lignin particles compared to the carbon black.

Example 3

Use of the Predispersion 2 Prepared in Example 1 in the Preparation of an Elastomeric Compound The predispersion 2 containing lignin according to Example 1 was used in variable amounts to produce two vulcanisable elastomeric compounds. The vulcanisable elastomeric compounds of the invention (INV2 and INV3) were compared with a lignin-free vulcanisable elastomeric compound (C2), considered as a conventional reference for structural elements of tire, in particular reinforcing elements of the belt structure, of the carcass structure, and of the bead structure.

The following Table 3 shows the phr compositions of the vulcanisable elastomeric compounds C2, INV2 and INV3. Predispersion 2 is added in such amounts as to provide 40 phr of natural rubber and 40 phr of lignin to the compound INV2, and 30 phr of natural rubber and 30 phr of lignin to the compound INV3.

TABLE 3

|  | C2 | INV2 | INV3 |
|---|---|---|---|
| NR | 100 | 60 | 70 |
| Predispersion 2 | — | 80 | 60 |
| CB | 55 | 37 | 42 |
| ZnO | 4.75 | 4.75 | 4.75 |
| Stearic acid | 1.5 | 1.5 | 1.5 |
| 6PPD | 2 | 2 | 2 |
| HMMM 65% | 3 | 3 | 3 |
| Novolac | 3 | 3 | 3 |
| PVI | 0.20 | 0.20 | 0.20 |
| CBS | 1.5 | 1.5 | 1.5 |
| Insoluble sulphur 66% | 5 | 5 | 5 |

NR: coagulated natural rubber, obtained by coagulation of natural rubber latex HA obtained by centrifugation and stabilised with ammonia (60% by weight-marketed by Von Bundit Co. Ltd);
CB: Carbon Black, N326, Cabot Corporation;
ZnO: Zinc oxide, Zincol Ossidi;
Stearic acid: Stearin, Undesa;
6PPD: N-(1,3-dimethylbutyl)-N'-phenyl-p-phenylenediamine, Solutia Eastman;
HMMM 65%: Cyrez 963, Cytec;
Novolac: phenol-formaldehyde resin with aldehyde: phenol ratio lower than 1 and acid catalysis, Hitanol 1502, Hitachi Kasei Co., Ltd.;
PVI: cyclohexylthiophthalimide, Santogard PVI;
CBS: N-cyclohexylbenzothiazole-2-sulphenamide, Rubenamid C, General Quimica;
Insoluble sulphur 66%: Sulphur, Redball Superfine, International Sulphur Inc.

All the components, with the exception of the sulphur, the vulcanisation accelerator (CBS) and the vulcanisation retardant (PVI), were mixed in an internal mixer (Brabender) for about 10 minutes (1st step).

When the temperature of 135° C. was reached, the material was mixed for another minute and then discharged. The unfinished compound was left to rest for a day then the sulphur, the accelerant (CBS) and the retarder (PVI) were added and the mixing was carried out in the same mixer at about 60° C. for 9 minutes (2nd step). Finally, the compound was vulcanised at 170° C. for 10 minutes, in order to be able to measure its static mechanical properties, while the dynamic mechanical properties were measured on the vulcanisable compound.

The static and dynamic mechanical properties of the compounds C2, INV2 and INV3 were evaluated as described in Example 2.

The following Table 4 shows the results obtained from the characterisations carried out.

TABLE 4

|  | C2 | INV2 | INV3 |
|---|---|---|---|
| Ca0.1 MPa | 1.28 | 0.95 | 1.07 |
| Ca0.5 MPa | 2.23 | 2.14 | 2.22 |
| Ca1 MPa | 3.41 | 3.62 | 3.69 |
| Ca3 MPa | 12.26 | 9.83 | 10.56 |
| CR MPa | 23.16 | 16.23 | 18.18 |
| AR % | 476.49 | 449.80 | 451.56 |
| d_G'(0.5-10) (MPa) | 4.93 | 2.18 | 3.07 |
| G' (9%) (MPa) | 2.44 | 1.90 | 2.10 |
| Tan Delta (9%) | 0.25 | 0.16 | 0.18 |
| E' MPa | 7.69 | 7.53 | 7.73 |
| Tan Delta | 0.131 | 0.105 | 0.113 |

The results of Table 4 showed that the compounds of the invention (INV2 and INV3), comprising a smaller substitution of carbon black with predispersion 2, maintained good values of tensile strength, however exhibiting a surprising and significant reduction in hysteresis (equal to approximately 25-20% of the reference value).

Example 4

Use of the Predispersions 2 and 3 Prepared in Example 1 in the Preparation of an Elastomeric Compound The predispersions 2 and 3 containing lignin according to Example 1 were used in variable amounts to produce two vulcanisable elastomeric compounds comprising 30 phr lignin. The vulcanisable elastomeric compounds of the invention (INV4 and INV5) were compared with a lignin-free vulcanisable elastomeric compound (C3), considered as a conventional reference for tire structural elements, with an elastomeric compound (C4) comprising 30 phr of lignin in powder, and with an elastomeric compound (C5) comprising 40 phr of predispersion 2.

The following Table 5 shows the phr compositions of the vulcanisable elastomeric compounds C3, C4, C5, INV4 and INV5.

Predispersion 2 is added in such amounts as to provide 20 phr of natural rubber and 20 phr of lignin to the compound C5, and 30 phr of natural rubber and 30 phr of lignin to the compound INV4, while predispersion 3 provides the total amount of natural rubber (100 phr) necessary for producing the compound INV5 and 30 phr of lignin.

TABLE 5

|  | C3 | C4 | C5 | INV4 | INV5 |
|---|---|---|---|---|---|
| NR | 100 | 100 | 80 | 70 | — |
| Lignin powder | — | 30 | — | — | — |
| Predispersion 2 | — | — | 40 | 60 | — |
| Predispersion 3 | — | — | — | — | 130 |
| CB | 60 | 47 | 47 | 47 | 47 |
| ZnO | 6 | 6 | 6 | 6 | 6 |
| Stearic acid | 1.5 | 1.5 | 1.5 | 1.5 | 1.5 |
| 6PPD | 2 | 2 | 2 | 2 | 2 |
| HMMM 65% | 3 | 3 | 3 | 3 | 3 |
| Resorcinol 80% | 2 | 2 | 2 | 2 | 2 |
| TBBS | 1 | 1 | 1 | 1 | 1 |
| Insoluble sulphur 66% | 5 | 5 | 5 | 5 | 5 |

NR: coagulated natural rubber, obtained by coagulation of natural rubber latex HA obtained by centrifugation and stabilised with ammonia (60% by weight-marketed by Von Bundit Co. Ltd);
Lignin powder: UPM BioPiva ™ 200 Softwood Kraft (UPM Biochemicals) having a median particle diameter D50 equal to or greater than 20 microns
CB: Carbon Black, N326, Cabot Corporation;
ZnO: Zinc oxide, Zincol Ossidi;
Stearic acid: Stearin, Undesa;
6PPD: N-(1,3-dimethylbutyl)-N'-phenyl-p-phenylenediamine, Solutia Eastman;
HMMM 65%: Cyrez 963, Cytec;
Resorcinol 80%: Kraeber & Co.;
TBBS: N-tert-butyl-2-benzothiazolsulphenamide, Vulkacit ® NZ/EGC, Lanxess;
Insoluble sulphur 66%: Sulphur, Redball Superfine, International Sulphur Inc.

All the components, except for sulphur and the vulcanisation accelerator (TBBS), were mixed in an internal mixer (Brabender) for about 10 minutes (1st step).

When the temperature of 135° C. was reached, the material was mixed for another minute and then discharged. The unfinished compound was left to rest for a day then the sulphur and the accelerator (TBBS) were added and the mixing was carried out in the same mixer at about 60° C. for 9 minutes (2nd step). Finally, the compound was vulcanised at 170° C. for 10 minutes, in order to be able to measure its static mechanical properties, while the dynamic mechanical properties were measured on the vulcanisable compound.

The static and dynamic mechanical properties of the compounds C3, C4, C5, INV4 and INV5 were evaluated as described in Example 2.

The following Table 6 shows the results obtained from the characterisations carried out.

TABLE 6

|  | C3 | C4 | C5 | INV4 | INV5 |
|---|---|---|---|---|---|
| Ca0.1 MPa | 1.19 | 0.77 | — | 0.93 | 0.81 |
| Ca0.5 MPa | 2.54 | 2.05 | 2.27 | 2.40 | 2.14 |
| Ca1 MPa | 4.41 | 3.61 | 4.54 | 4.47 | 4.29 |
| Ca3 MPa | 17.89 | 11.14 | 15.21 | 13.47 | 14.62 |
| CR MPa | 24.61 | 15.83 | 16.84 | 19.36 | 20.07 |
| AR % | 392.72 | 387.97 | 351.83 | 402.25 | 399.72 |
| d_G'(0.5-10) (MPa) | 3.55 | 1.31 | 3.32 | 1.88 | 1.21 |
| G' (9%) (MPa) | 2.48 | 1.67 | 2.13 | 1.82 | 1.49 |
| Tan Delta (9%) | 0.18 | 0.13 | 0.18 | 0.15 | 0.14 |
| E' MPa | 7.79 | 6.30 | 8.72 | 6.50 | 6.18 |
| Tan Delta | 0.111 | 0.095 | 0.111 | 0.098 | 0.098 |

The results of Table 6 showed that the compounds of the invention (INV4 and INV5), comprising respectively the predispersions 2 and 3 obtained with different processes, both show a considerable reduction of the hysteresis while maintaining good mechanical features. The comparison compound C4 made by adding powdered lignin, on the other hand, showed a reduced static reinforcement, with lower values of the load modules and the breaking load. The comparison compound C5, in addition to showing lower values of the load modules and of the breaking load, did not show any improvement in the hysteresis values.

Example 5

Use of the Elastomeric Compound INV4 in the Rubberising of Elongate Textile Members.

The vulcanisable elastomeric compound of the invention (INV4) and the lignin-free vulcanisable elastomeric compound (C3) of the previous example were used for rubberising polyester or rayon textile cords.

The adhesion force of the vulcanised rubberising layer to the cords was then measured according to the ASTM D4776 method (H-test) which determines the force required to remove the cord from the block of elastomeric material of the sample after vulcanisation.

The textile cords were previously treated by immersion in an adhesive RFL composition, comprising a latex of a styrene-butadiene-vinyl pyridine polymer, resorcinol and formaldehyde, and subsequent heating to about 200°-250° C. for fixing.

The cords thus treated were rubberised with the reference compound C3 and with the compound according to the invention INV4, the detailed compositions of which are reported in Table 5 of Example 4 to give representative samples of tire reinforcing elements.

The samples were prepared following the indications given in ASTM D4776 and subjected to the evaluation of adhesion, in accordance with the procedure, on specimens with a length of 9.52 mm.

The results, expressed by normalising the value of the reference compound C3 to 100, are summarised in the following Table 7.

TABLE 7

| Cord material | C3 | INV4 |
| --- | --- | --- |
| Polyester | 100 | 176 |
| Rayon | 100 | 292 |

The results of Table 7 showed a surprising and unexpected increase in the adhesion strength of the compound according to the invention INV4 both to the cords made of polyester and to the cords made of rayon.

The surprising and unexpected increase in the adhesion force of the compounds according to the invention INV4 leads the Applicant to believe, on the basis of their experience, that it is possible to omit from the rubberising compound the reinforcing resins comprising methylene acceptors and donors conventionally used in the rubberising compound.

The invention claimed is:

1. A tire for vehicle wheels comprising at least one structural component comprising at least one reinforcing element comprising an elongate member coated with, or embedded in, a vulcanised elastomeric compound comprising, before vulcanization, an elastomeric composition comprising per 100 phr of diene elastomeric polymer:
    (i) a predispersion of a first diene elastomeric polymer and lignin, in an amount to provide the elastomeric composition with 100 phr to 10 phr of the first diene elastomeric polymer and an amount of lignin equal to or greater than 25 phr,
    (ii) 0 phr to 90 phr of a second diene elastomeric polymer,
    (iii) at least 30 phr of a carbon black reinforcing filler,
    (iv) optionally, a reinforcing resin comprising at least 1 phr of a methylene acceptor compound associated with at least 1 phr of a methylene donor compound, and
    (v) 0.1 phr to 12 phr of at least one vulcanising agent,
    wherein at least 50 phr of the diene elastomeric polymer of the elastomeric composition consists of natural or synthetic isoprene rubber.

2. A structural component comprising at least one reinforcing element comprising an elongate member coated with, or embedded in, a vulcanised elastomeric compound comprising, before vulanicanisation, an elastomeric composition comprising per 100 phr of diene elastomeric polymer:
    (i) a predispersion of a first diene elastomeric polymer and lignin, in an amount to provide the elastomeric composition with 100 phr to 10 phr of the first diene elastomeric polymer and an amount of lignin equal to or greater than 25 phr,
    (ii) 0 phr to 90 phr of a second diene elastomeric polymer,
    (iii) at least 30 phr of a carbon black reinforcing filler,
    (iv) optionally, a reinforcing resin comprising at least 1 phr of a methylene acceptor compound associated with at least 1 phr of a methylene donor compound, and
    (v) 0.1 phr to 12 phr of at least one vulcanising agent,
    wherein at least 50 phr of the diene elastomeric polymer of the elastomeric composition consists of natural or synthetic isoprene rubber.

3. A reinforcing element comprising an elongate member coated with, or embedded in, a vulcanised elastomeric compound comprising, before vulcanization, an elastomeric composition comprising per 100 phr of diene elastomeric polymer:
    (i) a predispersion of a first diene elastomeric polymer and lignin, in an amount to provide the elastomeric composition with 100 phr to 10 phr of the first diene elastomeric polymer and an amount of lignin equal to or greater than 25 phr,
    (ii) 0 phr to 90 phr of a second diene elastomeric polymer,
    (iii) at least 30 phr of a carbon black reinforcing filler,
    (iv) optionally, a reinforcing resin comprising at least 1 phr of a methylene acceptor compound associated with at least 1 phr of a methylene donor compound, and
    (v) 0.1 phr to 12 phr of at least one vulcanising agent,
    wherein at least 50 phr of the diene elastomeric polymer of the elastomeric composition consists of natural or synthetic isoprene rubber.

4. An elastomeric composition comprising per 100 phr of diene elastomeric polymer:
    (i) a predispersion of a first diene elastomeric polymer and lignin, in an amount to provide the elastomeric composition with 100 phr to 10 phr of the first diene elastomeric polymer and an amount of lignin equal to or greater than 25 phr,
    (ii) 0 phr to 90 phr of a second diene elastomeric polymer,
    (iii) at least 30 phr of a carbon black reinforcing filler,
    (iv) optionally, a reinforcing resin comprising at least 1 phr of a methylene acceptor compound associated with at least 1 phr of a methylene donor compound, and
    (v) 0.1 phr to 12 phr of at least one vulcanising agent,
    wherein at least 50 phr of the diene elastomeric polymer of the elastomeric composition consists of natural or synthetic isoprene rubber.

5. The tire for vehicle wheels according to claim 1 or the structural component according to claim 2 or the reinforcing element according to claim 3 or the elastomeric composition according to claim 4, wherein the predispersion of the first diene elastomeric polymer and lignin is present in the elastomeric composition in an amount to provide the elastomeric composition with 100 phr to 20 phr of the first diene elastomeric polymer.

6. The tire for vehicle wheels according to claim 1 or the structural component according to claim 2 or the reinforcing element according to claim 3 or the elastomeric composition according to claim 4, wherein at least 60 phr of the diene elastomeric polymer of the elastomeric composition consists of natural or synthetic isoprene rubber.

7. The tire for vehicle wheels according to claim 1 or the structural component according to claim 2 or the reinforcing element according to claim 3 or the elastomeric composition according to claim 4, wherein the predispersion of the first diene elastomeric polymer and lignin is present in the elastomeric composition in such an amount as to provide the elastomeric composition with at least 30 phr of lignin.

8. The tire for vehicle wheels according to claim 1 or the structural component according to claim 2 or the reinforcing element according to claim 3 or the elastomeric composition according to claim 4, wherein the predispersion of the first diene elastomeric polymer and lignin comprises an amount of lignin equal to or greater than 45 phr.

9. The tire for vehicle wheels according to claim 1 or the structural component according to claim 2 or the reinforcing element according to claim 3, wherein the elongate member is made of a polymeric material or a metallic material, said polymeric material being selected from the group consisting of polyester, rayon, lyocell, and polyamide, and said metallic material being selected from the group consisting of steel and steel coated with copper/zinc, zinc/manganese, and zinc/molybdenum/cobalt metal alloys.

10. The tire for vehicle wheels according to claim 1, wherein the structural element is selected from the group consisting of carcass structure, belt structure, additional belt layer, rubberising layer, sidewall reinforcement layer or chafer, and bead reinforcement layer or flipper.

11. The tire for vehicle wheels according to claim 1 or the structural component according to claim 2 or the reinforcing element according to claim 3 or the elastomeric composition according to claim 4, wherein the predispersion of the first diene elastomeric polymer and lignin is present in the elastomeric composition in an amount to provide the elastomeric composition with 100 phr to 30 phr of the first diene elastomeric polymer.

12. The tire for vehicle wheels according to claim 1 or the structural component according to claim 2 or the reinforcing element according to claim 3 or the elastomeric composition according to claim 4, wherein at least 70 phr of the diene elastomeric polymer of the elastomeric composition consists of natural or synthetic isoprene rubber.

13. The tire for vehicle wheels according to claim 1 or the structural component according to claim 2 or the reinforcing element according to claim 3 or the elastomeric composition according to claim 4, wherein at least 80 phr of the diene elastomeric polymer of the elastomeric composition consists of natural or synthetic isoprene rubber.

14. The tire for vehicle wheels according to claim 1 or the structural component according to claim 2 or the reinforcing element according to claim 3 or the elastomeric composition according to claim 4, wherein the predispersion of the first diene elastomeric polymer and lignin is present in the elastomeric composition in such an amount as to provide the elastomeric composition from 30 phr to 60 phr of lignin.

15. The tire for vehicle wheels according to claim 1 or the structural component according to claim 2 or the reinforcing element according to claim 3 or the elastomeric composition according to claim 4, wherein the predispersion of the first diene elastomeric polymer and lignin is present in the elastomeric composition in such an amount as to provide the elastomeric composition from 30 phr to 50 phr of lignin.

16. The tire for vehicle wheels according to claim 1 or the structural component according to claim 2 or the reinforcing element according to claim 3 or the elastomeric composition according to claim 4, wherein the predispersion of the first diene elastomeric polymer and lignin comprises an amount of lignin equal to or greater than 50 phr.

17. The tire for vehicle wheels according to claim 1 or the structural component according to claim 2 or the reinforcing element according to claim 3 or the elastomeric composition according to claim 4, wherein the predispersion of the first diene elastomeric polymer and lignin comprises an amount of lignin equal to or greater than 60 phr and up to 160 phr.

* * * * *